United States Patent
Miao et al.

(10) Patent No.: US 11,871,162 B2
(45) Date of Patent: Jan. 9, 2024

(54) PROJECTION SYSTEM AND OPERATION METHOD THEREOF

(71) Applicant: Coretronic Corporation, Hsin-Chu (TW)

(72) Inventors: Yun-Lin Miao, Hsin-Chu (TW); Shao-Chi Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/513,898

(22) Filed: Oct. 29, 2021

(65) Prior Publication Data
US 2022/0337797 A1   Oct. 20, 2022

(30) Foreign Application Priority Data

Apr. 20, 2021   (CN) .......................... 202110421834.X

(51) Int. Cl.
*H04N 9/31* (2006.01)
*G03B 21/20* (2006.01)
*B60Q 1/24* (2006.01)

(52) U.S. Cl.
CPC ......... *H04N 9/3197* (2013.01); *G03B 21/208* (2013.01); *G03B 21/2013* (2013.01); *H04N 9/3141* (2013.01); *B60Q 1/247* (2022.05)

(58) Field of Classification Search
CPC .. H04N 9/3197; H04N 9/3141; H04N 9/3111; B60Q 1/24; G03B 21/2013; G03B 21/208
See application file for complete search history.

(56) References Cited

U.S. PATENT DOCUMENTS

| 2011/0148212 | A1* | 6/2011 | Kotani | G03B 21/14 307/80 |
| 2015/0245038 | A1* | 8/2015 | Clatanoff | H04N 9/3179 345/545 |

(Continued)

FOREIGN PATENT DOCUMENTS

| CN | 107272316 | 10/2017 |
| CN | 111347969 | 6/2020 |

(Continued)

OTHER PUBLICATIONS

"Office Action of China Counterpart Application", dated Jul. 8, 2023, p. 1-p. 8.

*Primary Examiner* — Magda Cruz
(74) *Attorney, Agent, or Firm* — JCIPRNET

(57) ABSTRACT

The disclosure relates to a projection system and an operation method thereof. The projection system includes a central control platform and a projection apparatus. The central control platform generates a sequence signal according to a self-defined setting. The projection apparatus is coupled to the central control platform and includes a power circuit, a first processing circuit, and an optical engine module. The power circuit passes the sequence signal through an energy storage element to generate a power supply. The first processing circuit performs an operation based on the power supply to generate a decoding result according to the sequence signal. The optical engine module obtains image information according to the decoding result and generates a display image according to the image information.

14 Claims, 9 Drawing Sheets

(56) References Cited

U.S. PATENT DOCUMENTS

| | | | | |
|---|---|---|---|---|
| 2017/0285450 A1* | 10/2017 | Furihata | ............. | G03B 21/2053 |
| 2019/0130868 A1* | 5/2019 | Kasahara | ................. | G09G 5/04 |
| 2019/0187546 A1* | 6/2019 | Furihata | ............... | H04N 9/3194 |
| 2020/0374496 A1* | 11/2020 | Tsao | ..................... | H04N 9/3141 |
| 2021/0037220 A1 | 2/2021 | Miao et al. | | |

FOREIGN PATENT DOCUMENTS

| | | |
|---|---|---|
| CN | 212364780 | 1/2021 |
| CN | 112533334 | 3/2021 |
| DE | 102019124513 | 3/2021 |
| JP | 2017017509 | 1/2017 |
| TW | 200951899 | 12/2009 |
| TW | 201024133 | 7/2010 |
| WO | 2014023170 | 2/2014 |

\* cited by examiner

PROJECTION SYSTEM AND OPERATION METHOD THEREOF

CROSS-REFERENCE TO RELATED APPLICATION

This application claims the priority benefit of China application serial no. 202110421834.X, filed on Apr. 20, 2021. The entirety of the above-mentioned patent application is hereby incorporated by reference herein and made a part of this specification.

BACKGROUND

Technical Field

The disclosure relates to a projection system and an operation method thereof, and more particularly, to a projection system and an operation method thereof which determine a projection content according to a power sequence signal.

Description of Related Art

As automotive electronics continues to develop, more and more novel and creative electronic products have been applied to cars, and the puddle lamp is one typical example. The puddle lamp is installed at the bottom of the vehicle door. When the vehicle door is opened, the puddle lamp is turned on to project a specific pattern onto the ground. When the vehicle door is closed, the projected pattern disappears. In addition, since the puddle lamp can illuminate the ground, the passenger can see the ground more clearly when getting in and out of the vehicle. Accordingly, safety hazards such as puddles, mud, and gravel may be timely discovered, and passenger safety can be improved.

Generally, the manufacturing process of a puddle lamp includes ID molding of a mark (e.g., the logo of a brand car) and coating. Next, the puddle lamp is installed on the display device of the vehicle door. However, if the car owner intends to replace the pattern of the puddle lamp, he/she will need to replace it manually. In other words, the installation and replacement of the puddle lamp is inconvenient. Therefore, it is necessary to provide a solution to improve the convenience of replacing a projection content of the puddle lamp.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure were acknowledged by a person of ordinary skill in the art.

SUMMARY

The disclosure provides a projection system and an operation method thereof which make it possible to set a projection content and conveniently replace the projection content.

Other objectives and advantages of the disclosure may be further understood from the technical features disclosed herein.

To achieve one, part, or all of the above objectives or other objectives, an embodiment of the disclosure provides a projection system including a central control platform and a projection apparatus. The central control platform is configured to generate a sequence signal according to a self-defined setting. The projection apparatus is coupled to the central control platform. The projection apparatus includes a power circuit, a first processing circuit, and an optical engine module. The power circuit is configured to pass the sequence signal through an energy storage element to generate a power supply. The first processing circuit is coupled to the power circuit to perform an operation according to the power supply. The first processing circuit is further configured to generate a decoding result according to the sequence signal. The optical engine module is coupled to the first processing circuit and is configured to obtain image information according to the decoding result and generate a display image according to the image information.

To achieve one, part, or all of the above objectives or other objectives, an embodiment of the disclosure provides an operation method of a projection system, including the following steps. A central control platform generates a sequence signal according to a self-defined setting. A power circuit of a projection apparatus passes the sequence signal through an energy storage element to generate a power supply. A first processing circuit of the projection apparatus performs an operation according to the power supply, and the first processing circuit generates a decoding result according to the sequence signal. An optical engine module of the projection apparatus obtains image information according to the decoding result and generates a display image according to the image information.

Based on the above, the embodiments of the disclosure exhibit at least one of the following advantages or effects. In the disclosure, while the central control platform provides a power supply to the projection apparatus, a content to be projected is instructed to the first processing circuit of the projection apparatus through a sequence signal of the power supply at the same time. Therefore, it is possible to realize replacement of a projection content and improve the convenience of replacing the projection content.

To make the aforementioned more comprehensible, several embodiments accompanied with drawings are described in detail as follows.

Other objectives, features and advantages of the disclosure will be further understood from the further technological features disclosed by the embodiments of the disclosure wherein there are shown and described exemplary embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The foregoing and other technical contents, features, and effects of the disclosure will be clearly presented in the following detailed description of the exemplary embodiments with reference to the accompanying drawings. The directional terms, such as "up", "down", "left", "right", "front", or "back", mentioned in the following embodiments only refer to the orientations of the drawings. Therefore, the directional terms used are intended to illustrate, rather than limit, the disclosure.

Figure 1:
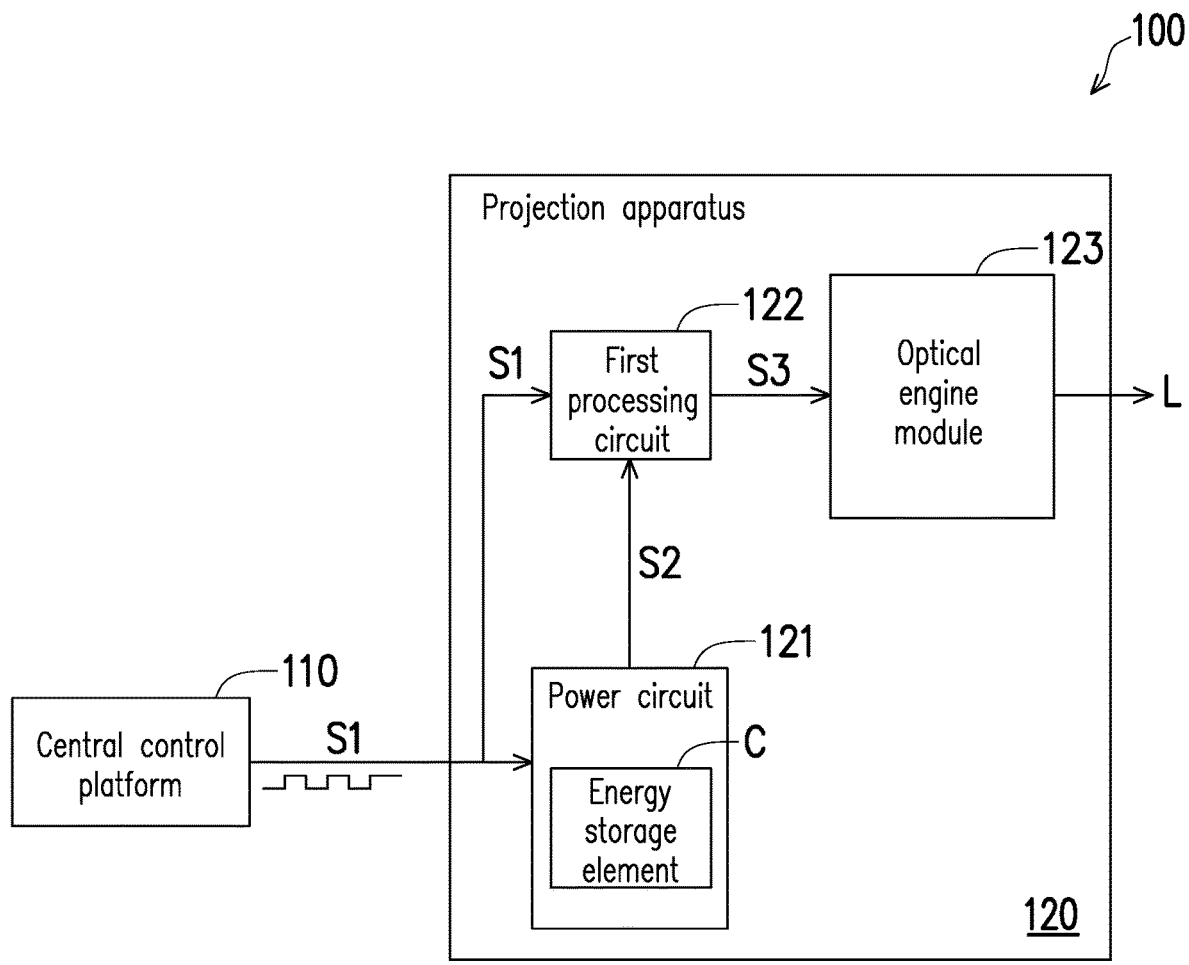
FIG. 1 is a block diagram showing a projection system according to an embodiment of the disclosure.

A projection system and its operation method of the disclosure may be applied to any device, tool, and equipment provided with a vehicle door, a cabin door, or an entrance/exit, such as a vehicle, an airplane, a ship, and other transports. FIG. 1 is a block diagram showing a projection system according to an embodiment of the disclosure. Referring to FIG. 1, a projection system 100 includes a central control platform 110 and a projection apparatus 120. The central control platform 110 is configured to generate a sequence signal S1 according to a self-defined setting. In this embodiment, taking a car as an example for illustration, the central control platform 110 may be a vehicle-mounted computer. The self-defined setting may be generated by the user's operation on an in-vehicle touch screen. For example, through the in-vehicle touch screen, the user may set a display content of a puddle lamp to be a selected pattern or a selected video. Alternatively, the user may select both a pattern and a video as the display content.

The projection apparatus 120 is coupled to the central control platform 110. The projection apparatus 120 includes a power circuit 121, a first processing circuit 122, and an optical engine module 123. The power circuit 121 is configured to pass the sequence signal S1 generated by the central control platform 110 through an energy storage element C to generate a power supply S2 for each element or module in the projection apparatus 120. In this embodiment, a voltage compatible with the first processing circuit 122 is 3.3 V, and the energy storage element C may be composed of one or more capacitors. It is noted that the sequence signal S1 generated by the central control platform 110 switches between a working voltage (e.g., 12 V) and a reference ground potential (e.g., 0 V) to thereby indicate "0" and "1" of a digital signal. In other words, in addition to supplying power to the projection apparatus 120 through the sequence signal S1, the sequence signal S1 itself is also used to transmit a meaningful command signal associated with a projection content.

The first processing circuit 122 is coupled to the power circuit 121 to perform an operation according to the power supply S2. The first processing circuit 122 is further configured to perform decoding according to the sequence signal S1 to generate a decoding result S3. The optical engine module 123 is coupled to the first processing circuit 122 to obtain image information according to the decoding result S3 and generate a display image L according to the image information.

Figure 2:
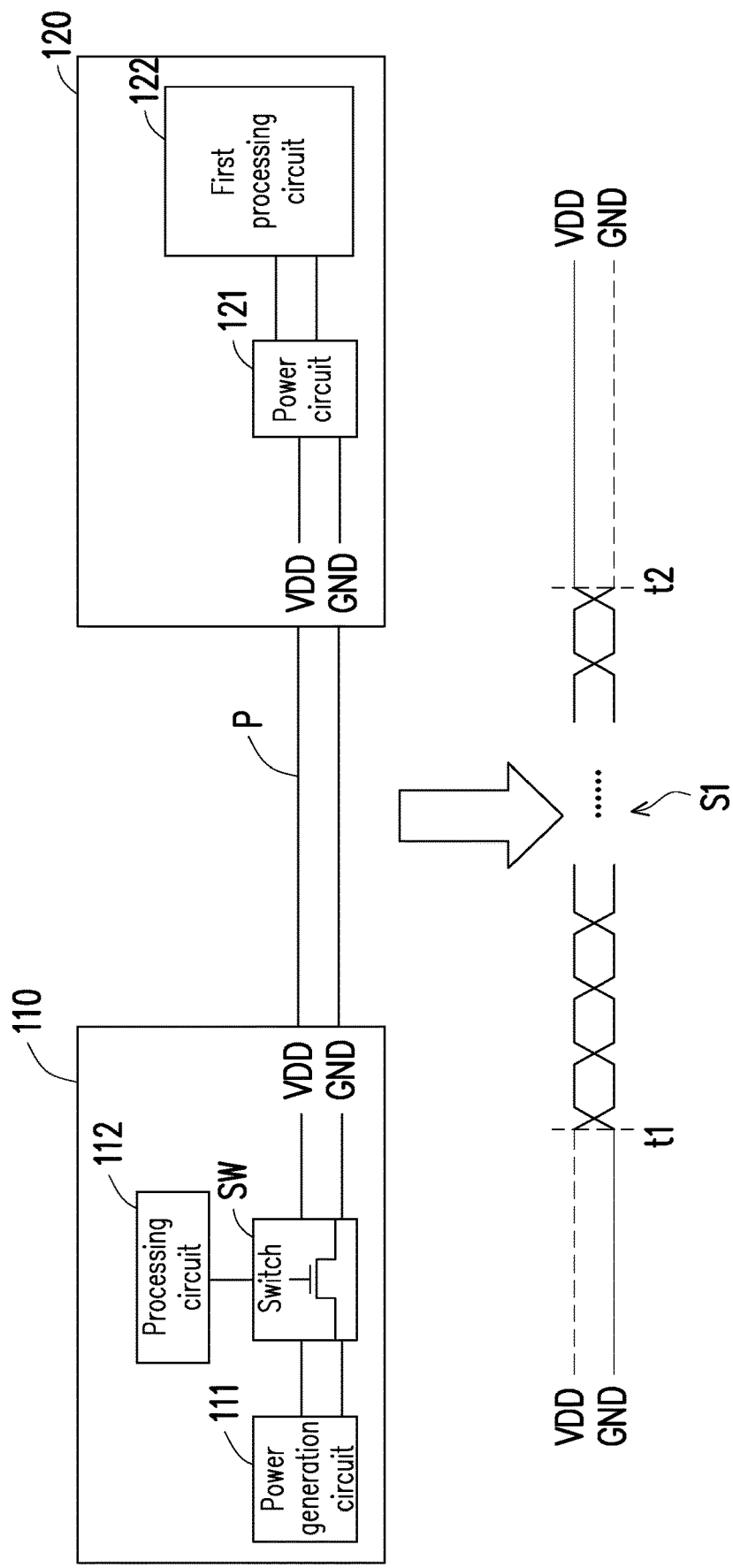
FIG. 2 is a block diagram showing a central control platform and a projection apparatus.

FIG. 2 is a block diagram showing the central control platform and the projection apparatus. Referring to FIG. 2, the central control platform 110 includes a power generation circuit 111, a processing circuit 112, and a switch SW. The power generation circuit 111 is configured to generate a power voltage. The switch SW is disposed on the transmission path of the power voltage. The processing circuit 112 is configured to control the switching operation of the switch SW according to the self-defined setting to generate a sequence signal S1 switching between a first voltage (e.g., a working voltage VDD) and a second voltage (e.g., a reference ground potential GND) in a time interval (e.g., between time point t1 and time point t2 shown in FIG. 2). The sequence signal S1 is transmitted to the power circuit 121 and the first processing circuit 122 of the projection apparatus 120 via a power line P. For descriptions of the functions of the power circuit 121 and the first processing circuit 122 in the projection apparatus 120, reference may be made to the descriptions of the components of the same names in FIG. 1, and the descriptions shall not be repeated herein.

Figure 3:
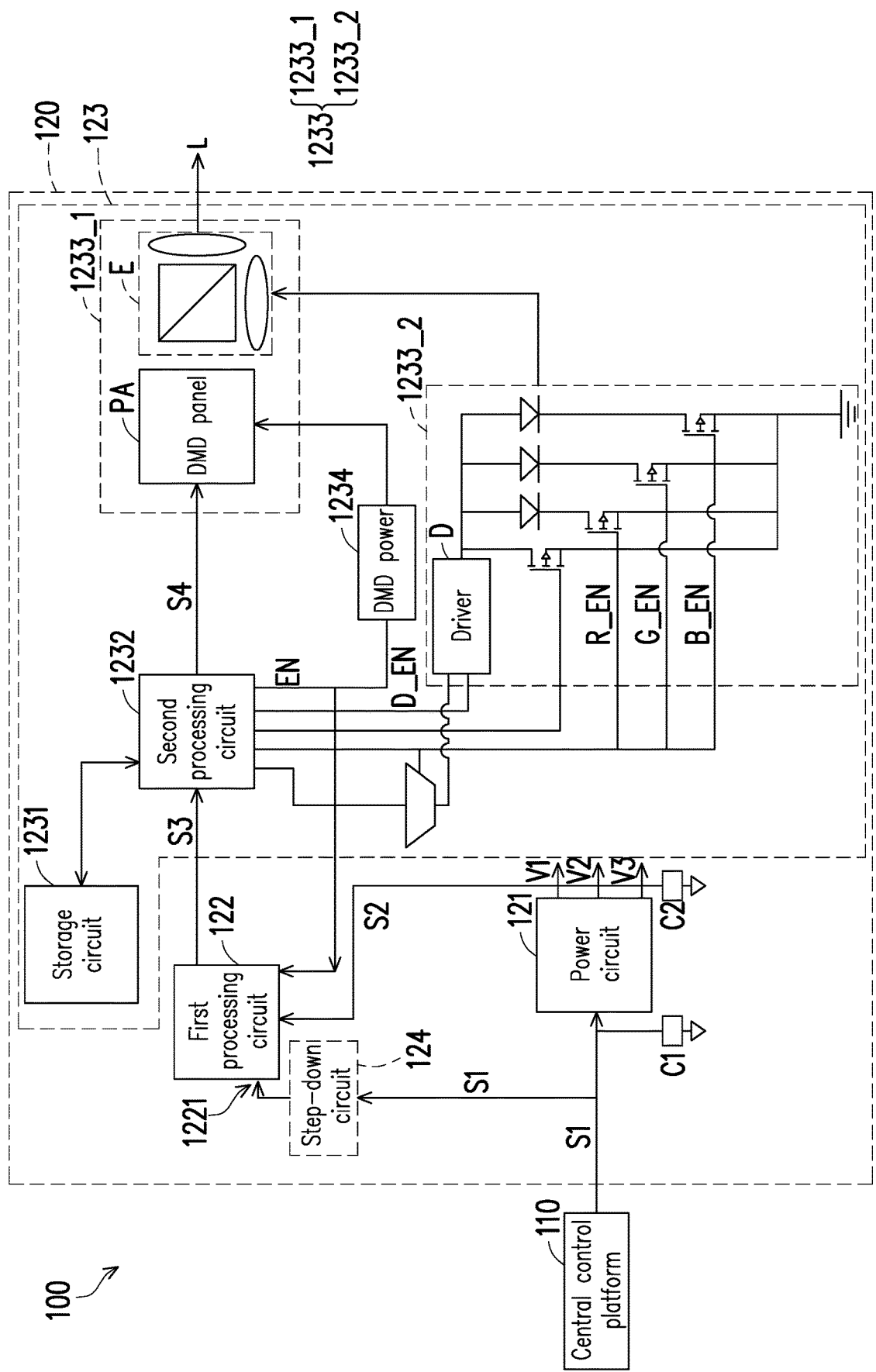
FIG. 3 is a schematic structural view showing a projection system according to an embodiment of the disclosure.

FIG. 3 is a schematic structural view showing a projection system according to an embodiment of the disclosure. Referring to FIG. 3, the power circuit 121 receives a sequence signal S1 from the central control platform 110 and generates operating voltages V1 to V3 compatible with the elements or modules in the projection apparatus 120 according to the sequence signal S1. In this embodiment, one of the operating voltages V1 to V3 is taken as a power supply S2 of the first processing circuit 122. According to FIG. 3, capacitors C1 and C2, which serve as the energy storage element, are respectively disposed at the input terminal and the output terminal of the power circuit 121. However, the disclosure is not limited thereto. In other embodiments, the capacitors C1 and C2 may also be provided separately. The capacitors C1 and C2 are configured to control the time in which the sequence signal S1 is dropped from the working voltage to the reference ground potential. In other words, when the sequence signal S1 is switched from the working voltage to the reference ground potential, the first processing circuit 122 may still obtain a power voltage sufficient for maintaining its operation from the power circuit 121 in the process of capacitor discharge.

Figure 4:
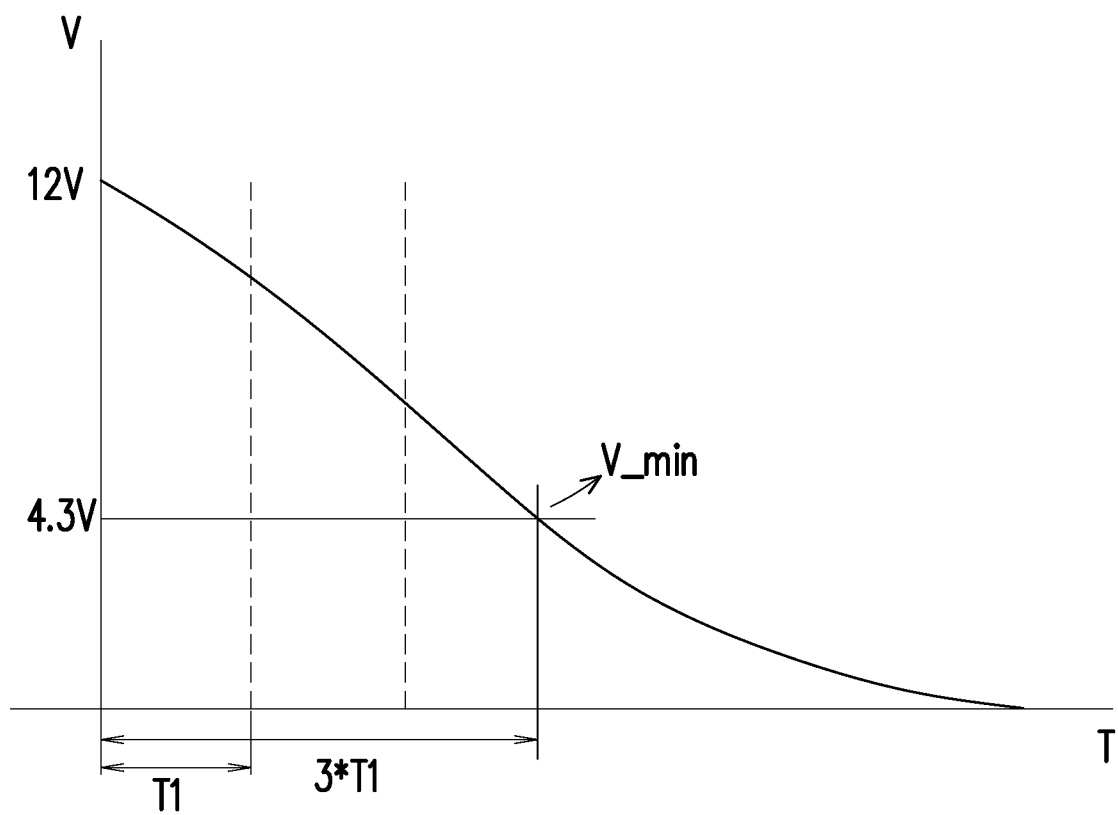
FIG. 4 is a schematic discharge waveform graph of an energy storage element.

FIG. 4 is a schematic discharge waveform graph of the energy storage element. Referring to FIG. 4, the horizontal axis represents time T, and the vertical axis represents voltage V. A voltage Vmin represents a minimum energy storage voltage for the power circuit 121 to output the power supply S2 required for maintaining the operation of the first processing circuit 122. According to FIG. 4, the duration of dropping from full power storage (e.g., 12 V) to the voltage Vmin is equivalent to the duration of three time intervals T1 (denoted as 3*T1). In this embodiment, the duration of one time interval T1 is associated with the duration required for the sequence signal S1 to transmit "0" and "1" of a digital signal. In other words, in the case where a digital signal "1000" is to be transmitted through the sequence signal S1, in the section "000" of "1000", the first processing circuit 122 may still obtain the power supply S2 from the power circuit 121 to perform the decoding operation.

Referring to FIG. 3 again, due to the limitation of the voltage magnitude that can be received by the first processing circuit 122, the sequence signal S1 is stepped down by a step-down circuit 124 and then transmitted to the first processing circuit 122. The first processing circuit 122 performs an operation according to the power supply S2 provided by the power circuit 121 to decode the stepped-down sequence signal S1. In an embodiment, the first processing circuit 122 may receive the stepped-down sequence signal S1 via its general-purpose input/output (GPIO) pin 1221. The first processing circuit 122 is configured to decode the stepped-down sequence signal S1 to generate a decoding result S3 in the form of a digital signal.

The optical engine module 123 mainly includes a storage circuit 1231, a second processing circuit 1232, an imaging device 1233, and a DMD power 1234. Multiple pieces of candidate image information are stored in the storage circuit 1231 in advance. The second processing circuit 1232 is coupled to the first processing circuit 122 and is configured to obtain image information S4 corresponding to the decoding result S3 from among the multiple pieces of candidate image information according to the decoding result S3. In this embodiment, the second processing circuit 1232 may be a field programmable gate array (FPGA) which performs the above functions or an application specific integrated circuit (ASIC). The imaging device 1233 includes an imaging element 1233_1 and a light source 1233_2.

The imaging element 1233_1 includes a light valve PA and a light transmission module E. In this embodiment, the light valve PA is, for example, a digital micromirror device (DMD) panel, and the light transmission module E includes, for example, at least one optical lens and a total reflection prism (TIR). The second processing circuit 1232 transmits the image information S4 to the light valve PA. The second processing circuit 1232 also generates an enable signal EN to enable the DMD power 1234, so that the DMD power 1234 supplies power to the light valve PA. The light source 1233_2 functions to filter light to form red light, blue light, and green light. In an embodiment, white light and yellow light may be further added. These color lights are transmitted to the light transmission module E, and through the light transmission module E, these color lights are sequentially irradiated on the light valve PA. A microlens array composed of microlenses on the light valve PA reflects an image corresponding to these color lights to the light transmission module E to thereby project and form an image. The light valve PA controls the rotation angle of each microlens according to the image information S4 to correctly reflect the light outward to form a display image L. The second processing circuit 1232 is further configured to generate enable signals R_EN, G_EN, and B_EN. The red light source, the green light source, and the blue light source in the light source 1233_2 respectively emit lights according to the enable signals R_EN, G_EN, and B_EN and are driven by a driver D to sequentially irradiate the lights on the light valve PA. The driver D operates according to an enable signal D_EN generated by the second processing circuit 1232.

Figure 5:
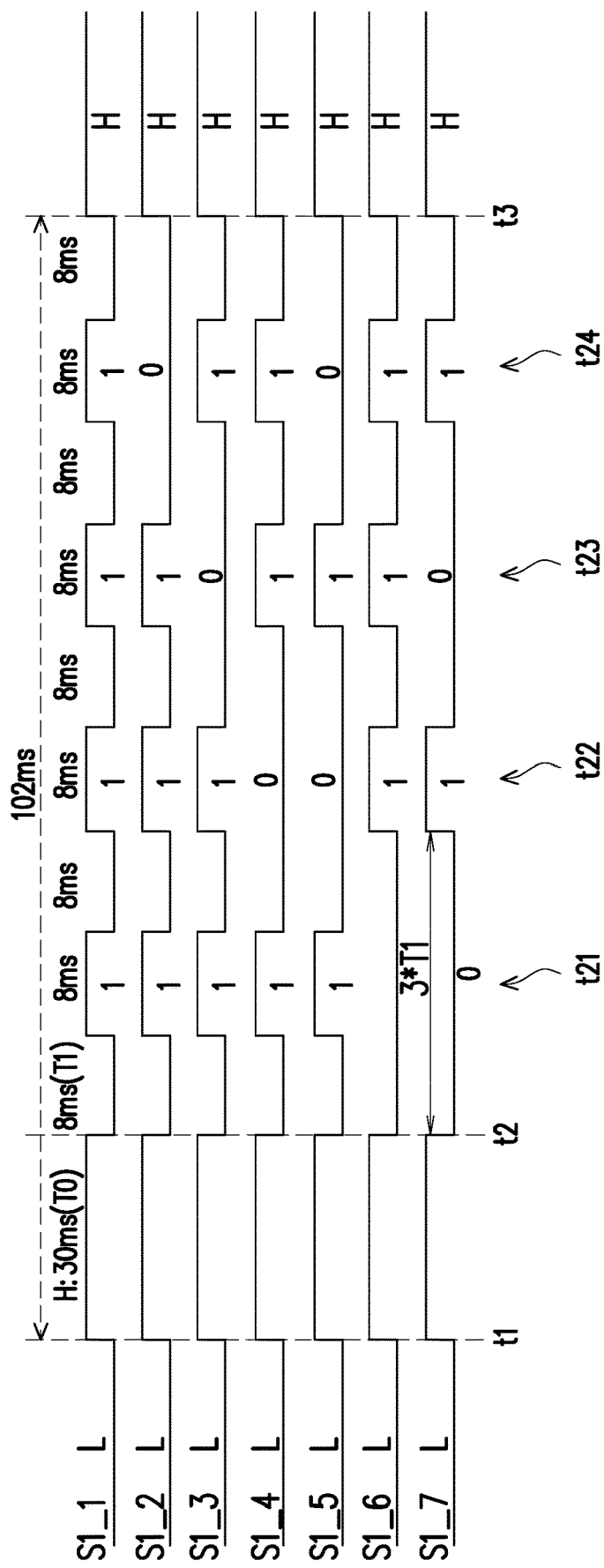
FIG. 5 is a schematic waveform chart of sequence signals according to an embodiment of the disclosure.

FIG. 5 is a schematic waveform chart of sequence signals according to an embodiment of the disclosure. FIG. 5 shows multiple sequence signals S1_1 to S1_7. Referring to FIG. 3 and FIG. 5, after time point t3, the central control platform 110 starts to supply power normally. In a short period (between time point t1 and time point t3, for example, about 102 milliseconds) before the normal power supply, the central control platform 110 may transmit sequence signal contents with four duty cycles. The sequence signals S1_1 to S1_7 are all at the reference ground potential (i.e., the central control platform 110 does not supply power) before time point t1. The voltage levels of the sequence signals S1_1 to S1_7 are pulled up to the working voltage at time point t1 and maintained for a time interval T0, so that the first processing circuit 122 is woken up to perform an initial setting. Between time point t2 and time point t3, the first processing circuit 122 may obtain the current voltage levels of the sequence signals S1_1 to S1_7 through regular sampling operations and convert them into digital signals. Taking the sequence signal S1_1 as an example, the first processing circuit 122 may sample at time points t21, t22, t23, and t24 to obtain a digital signal "1111" (4 bits). The same also applies to the rest of the sequence signals S1_2 to S1_7.

It is shown that in the time interval T1 after time point t2, the sequence signals S1_1 to S1_7 all drop from the working voltage to the reference ground potential, and the duration in which the sequence signal S1_7 is dropped to the reference ground potential is as long as 3*T1. However, with the energy storage element provided, the power circuit 121 of the projection apparatus 120 still supplies a voltage sufficient for the first processing circuit 122 to maintain its operation, and the maintaining time may be up to the duration of three time intervals T1 (corresponding to 3*T1 in FIG. 4). Therefore, in this period (3*T1), the power circuit 121 of the projection apparatus 120 can still provide a voltage sufficient for the first processing circuit 122 to maintain its operation, so that the first processing circuit 122 does not lose power and become inoperable. With the energy storage element, the speed in which the working voltage is dropped to the reference ground potential is reduced. Therefore, after the first high voltage level, it is not required to perform the initial setting of the first processing circuit 122 again, which can significantly save the detection time. In other embodiments, the capacitance of the energy storage element may also be changed to lengthen or shorten the above maintaining time. Taking the sequence signal S1_1 as an example, the second processing circuit 1232 of the optical engine module 123 may look up the corresponding image information S4 in the storage circuit 1231 according to the decoding result (i.e., a digital signal "1111") of the decoding operation.

Figure 6:
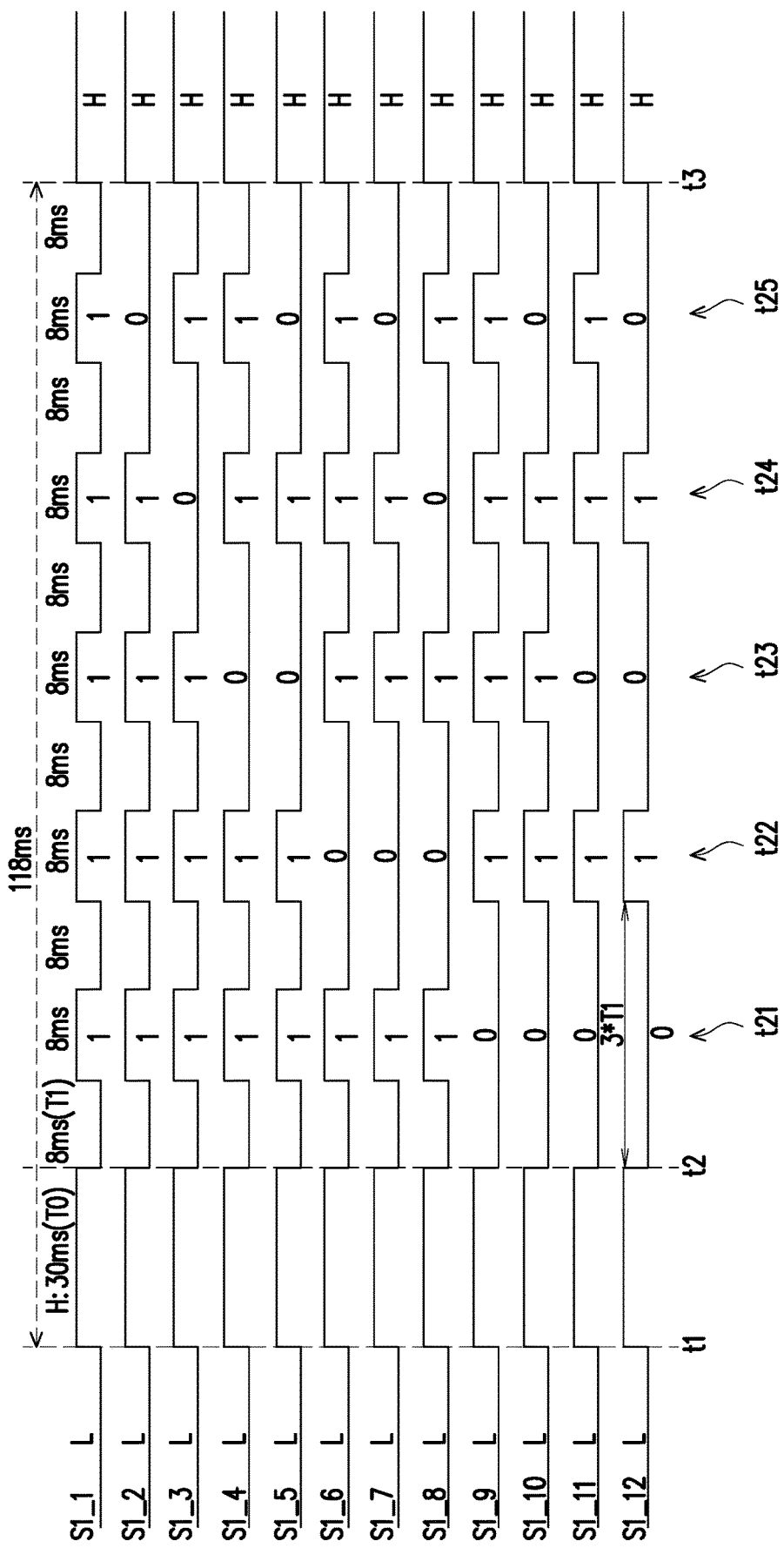
FIG. 6 is a schematic waveform chart of sequence signals according to an embodiment of the disclosure.

FIG. 6 is a schematic waveform chart of sequence signals according to an embodiment of the disclosure. The difference between FIG. 6 and FIG. 5 only lies in the duration between time point t1 and time point t3. In FIG. 6, the duration between time point t1 and time point t3 is, for example, as long as 118 milliseconds, which can accommodate a data amount of 5 bits (corresponding to five duty cycles). Similarly, the sequence signals S1_1 to S1_12 are all at the reference ground potential (i.e., the central control platform 110 does not supply power) before time point t1. The voltage levels of the sequence signals S1_1 to S1_12 are pulled up to the working voltage at time point t1 and maintained for a time interval T0, so that the first processing circuit 122 is woken up to perform an initial setting. Between time point t2 and time point t3, the first processing circuit 122 may obtain the current voltage levels of the sequence signals S1_1 to S1_12 through regular sampling operations and convert them into digital signals. Taking the sequence signal S1_1 as an example, the first processing circuit 122 may sample at time points t21, t22, t23, t24, and t25 to obtain a digital signal "11111" (5 bits). The same may also apply to the rest of the sequence signals S1_2 to S1_12. In another embodiment, when the information amount carried by the sequence signal S1 reaches 10 bits (corresponding to 10 duty cycles), it only takes 198 milliseconds to complete the communication. Similarly, with the energy storage element, the speed in which the working voltage is dropped to the reference ground potential is reduced. Therefore, after the first high voltage level, it is not required to perform the initial setting of the first processing circuit 122 again, which can significantly save the detection time.

Figure 7:
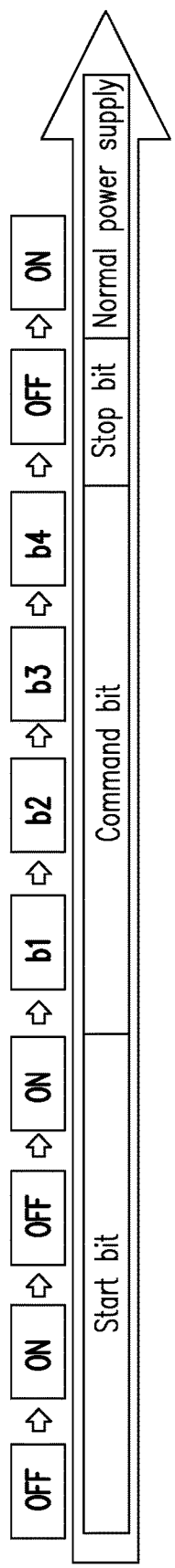
FIG. 7 is a schematic waveform chart of sequence signals according to an embodiment of the disclosure.

In an embodiment, a command set may be further used to issue a command to the first processing circuit 122. FIG. 7 is a schematic waveform chart of sequence signals according to an embodiment of the disclosure. Referring to FIG. 1 and FIG. 7, the sequence signal S1 is composed of a start bit, a command bit, and a stop bit. The switching operation of the switch SW (see FIG. 2) is controlled at the central control platform 110 (e.g., a vehicle-mounted computer) end to generate the sequence signal S1. Through the sequence signal S1, the central control platform 110 may supply power to the power circuit 121, and the sequence signal S1 may be used as a command signal to the first processing circuit 122 at the same time. When the power circuit 121 receives the sequence signal S1, the first processing circuit 122 becomes powered to perform an operation. According to the initially detected "LHLH" (L and H respectively represent the low voltage level and the high voltage level), the first processing circuit 122 may recognize that it is a start bit signal of the sequence signal S1. At this time, the first processing circuit 122 is ready to receive the next command bit (e.g., the command bit "LLLL" of No. 1). The command bit is followed by the stop bit (L) to indicate the end of the sequence signal S1. Afterwards, the central control platform 110 starts to supply power normally.

It is noted that in this embodiment, the sequence signal S1 may be received by an analog-to-digital (ADC) pin of the first processing circuit 122. The ADC pin may determine whether it is H or L according to a voltage drop difference. The first processing circuit 122 may store the digital information represented by the detected command bit (e.g., the command bit "LLLL" of No. 1) to a storage device inside the first processing circuit 122 to subsequently perform a decoding operation thereon after normal power supply. The first processing circuit 122 may store a correspondence table in advance. The correspondence table includes the digital information represented by multiple command bits, and multiple pieces of projection content combination information respectively corresponding to the digital information. For example, the first processing circuit 122 may find corresponding first projection content combination information according to the digital information represented by the command bit "LLLL". The first processing circuit 122 further has the second processing circuit 1232 (see FIG. 3) read, from the storage circuit 1231 (see FIG. 3), the corresponding images and/or videos, the sequence of projecting the images and/or videos, and the duration of projection, according to the first projection content combination information. Accordingly, upon setting multiple command contents in the central control platform 110 in advance and setting multiple pieces of corresponding projection content combination information in the first processing circuit 122 in advance, more complex projection content combinations can be completed. In FIG. 7, "Default" indicates that when the sequence signal S1 does not match, the previous projection content combination is maintained. Although FIG. 7 only shows a command bit of 4 bits (respectively denoted as b1 to b4), the disclosure is not limited thereto. In other embodiments, the number of bits of the command bit may be arbitrary.

Figure 8:
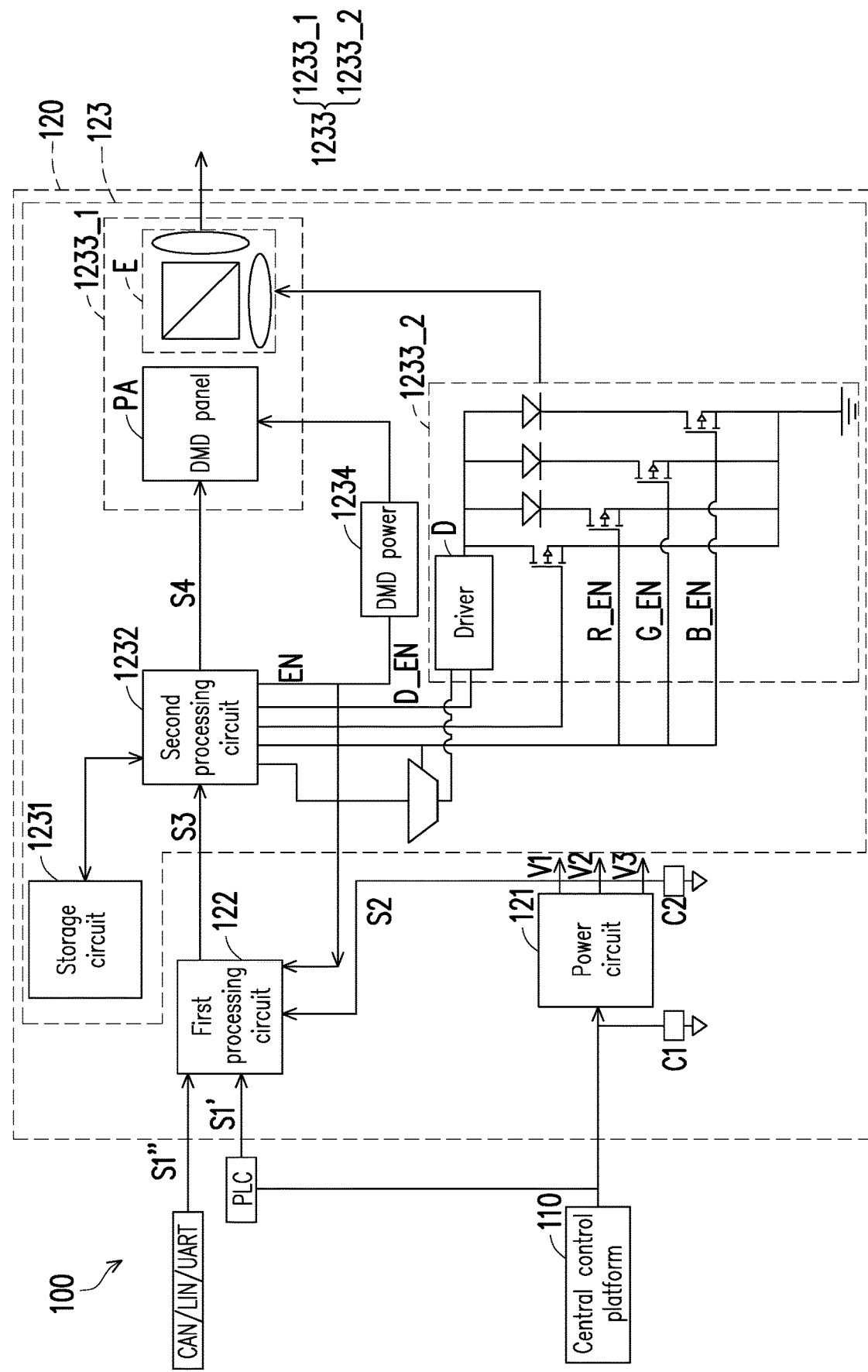
FIG. 8 is a schematic structural view showing a projection system according to an embodiment of the disclosure.

FIG. 8 is a schematic structural view showing a projection system according to an embodiment of the disclosure. The difference between FIG. 8 and FIG. 3 only lies in the method of transmitting the sequence signal. Referring to FIG. 8, the central control platform 110 may transmit a sequence signal S1' to the ADC pin of the first processing circuit 122 through a power line communication (PLC) mechanism. The power line communication technology refers to a communication method of transmitting data and media signals via power lines. A high-frequency signal carrying information is carried on the electric current and transmitted via the power line, and then the high-frequency signal is separated from the electric current to realize the information transmission. Therefore, in this embodiment, the central control platform 110 end and the first processing circuit 122 end of the projection apparatus 120 are provided with corresponding processing chips. In other embodiments, the central control platform 110 may also transmit a sequence signal S1" through a controller area network (abbreviated as CAN or CAN bus), a local interconnect network (LIN), or a universal asynchronous receiver/transmitter (UART). Although FIG. 8 shows PLC, CAN, LIN, and UART at the same time, in fact, only one of these transmission mechanisms is adopted for signal transmission. In addition, for detailed descriptions of the functions of the other components in FIG. 8, reference may be made to the descriptions of the components of the same names in FIG. 3, and the descriptions shall not be repeated herein.

In terms of the hardware, the block of the first processing circuit may be implemented as a logic circuit on an integrated circuit. The relevant functions of the first processing circuit may be implemented as hardware by using hardware description languages (e.g., Verilog HDL or VHDL) or other suitable programming languages. For example, the relevant functions of the first processing circuit may be implemented as one or more controllers, microcontrollers, microprocessors, application specific integrated circuits (ASIC), digital signal processors (DSP), field programmable gate arrays (FPGA), and/or various other logic blocks, modules, and circuits in processing units.

Figure 9:
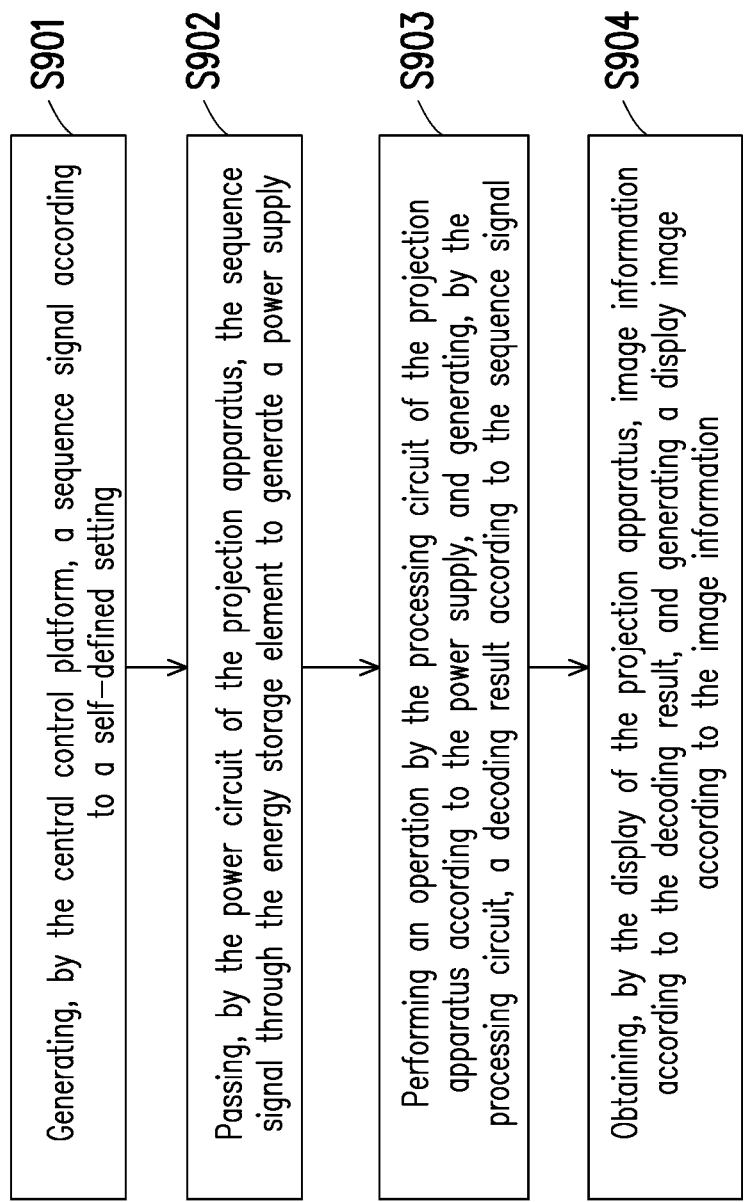
FIG. 9 is a flowchart showing steps of an operation method of a projection system according to an embodiment of the disclosure.

FIG. 9 is a flowchart showing steps of an operation method of a projection system according to an embodiment of the disclosure. Referring to FIG. 1 and FIG. 9, in step S901, the central control platform 110 generates a sequence signal S1 according to a self-defined setting. In step S902, the power circuit 121 of the projection apparatus 120 passes the sequence signal through the energy storage element C to generate a power supply S2. In step S903, the first processing circuit 122 of the projection apparatus 120 performs an operation according to the power supply S2, and the first processing circuit 122 generates a decoding result S3 according to the sequence signal S1. In step S904, the optical engine module 123 of the projection apparatus 120 obtains image information according to the decoding result S3 and generates a display image L according to the image information.

In summary of the above, the embodiments of the disclosure exhibit at least one of the following advantages or effects. In the disclosure, while the central control platform (e.g., a vehicle-mounted computer) provides a power supply to the projection apparatus (e.g., a puddle lamp of a vehicle door), a content to be projected is instructed to the first processing circuit of the projection apparatus through a sequence signal of the power supply at the same time.

Through the design of the energy storage element, it is possible to significantly save a detection time of the sequence signal, realize replacement of a projection content, and improve the convenience of replacing the projection content.

The above are only exemplary embodiments of the disclosure and should not be used to limit the scope of implementation of the disclosure. In other words, any simple equivalent changes and modifications made according to the claims and description of the disclosure are still within the scope of the disclosure. Also, the solution of any embodiment or claim of the disclosure is not required to achieve all the objectives, advantages, or features disclosed herein. Moreover, the abstract and the title are only intended to assist in the search of patent documents and are not intended to limit the claims of the disclosure. In addition, the terms "first" and "second" mentioned in this specification or claims are only used for naming the components or distinguishing among different embodiments or ranges, and are not used to limit the upper or lower limit of the number of components.

The foregoing description of the exemplary embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A projection system comprising a central control platform and a projection apparatus, wherein the central control platform is configured to generate a sequence signal according to a self-defined setting, and the projection apparatus is coupled to the central control platform, wherein the projection apparatus comprises:

a power circuit configured to pass the sequence signal through an energy storage element to generate a power supply;

a first processing circuit coupled to the power circuit to perform an operation according to the power supply, the first processing circuit being further configured to generate a decoding result according to the sequence signal;

an optical engine module coupled to the first processing circuit and configured to obtain image information according to the decoding result from the first processing circuit and generate a display image according to the image information;

a storage circuit configured to store multiple pieces of candidate image information;

a second processing circuit coupled to the first processing circuit and configured to obtain the image information from the multiple pieces of candidate image information of the storage circuit according to the decoding result; and an imaging device configured to perform projection according to the image information to generate the display image.

2. The projection system according to claim 1, wherein the central control platform generates the sequence signal switching between a first voltage and a second voltage in a time interval according to the self-defined setting.

3. The projection system according to claim 1, wherein the central control platform comprises:

a power generation circuit configured to generate a first voltage; and a switch disposed on a transmission path of the first voltage and generating the sequence signal according to the self-defined setting.

4. The projection system according to claim 1, further comprising:

a step-down circuit configured to step down the sequence signal and then transmit to the first processing circuit.

5. The projection system according to claim 1, wherein the first processing circuit receives the sequence signal via a general-purpose input/output pin or an analog-to-digital pin.

6. The projection system according to claim 1, wherein the central control platform transmits the sequence signal to the first processing circuit through a power line communication mechanism, a controller area network, a local interconnect network, or a universal asynchronous receiver/transmitter.

7. The projection system according to claim 1, wherein the projection apparatus further comprises:

a light valve coupled to the second processing circuit and comprising a microlens array composed of multiple microlenses, wherein the light valve is configured to determine a rotation angle of each of the microlenses according to the image information; and a light source configured to generate multiple color lights, so that the color lights are sequentially irradiated on the microlens array to thereby generate the display image.

8. An operation method of a projection system, wherein the projection system comprises a central control platform and a projection apparatus coupled to the central control platform, wherein the projection apparatus further comprises a storage circuit, a second processing circuit, and an imaging device, the operation method comprising:

generating, by the central control platform, a sequence signal according to a self-defined setting;

passing, by a power circuit of the projection apparatus, the sequence signal through an energy storage element to generate a power supply;

performing an operation by a first processing circuit of the projection apparatus according to the power supply, and generating, by the first processing circuit, a decoding result according to the sequence signal;

obtaining, by an optical engine module of the projection apparatus, image information according to the decoding result from the first processing circuit, and generating a display image according to the image information;

storing multiple pieces of candidate image information to the storage circuit in advance;

obtaining, by the second processing circuit, the image information from the multiple pieces of candidate image information of the storage circuit according to the decoding result; and performing projection according to the image information by the imaging device to generate the display image.

9. The operation method of the projection system according to claim 8, further comprising:

generating, by the central control platform, the sequence signal switching between a first voltage and a second voltage in a time interval according to the self-defined setting.

10. The operation method of the projection system according to claim 8, wherein the central control platform comprises a power generation circuit and a switch, the operation method further comprising:

generating a first voltage by the power generation circuit; and generating, by the switch, the sequence signal through a switching operation according to the self-defined setting, wherein the switch is disposed on a transmission path of the first voltage.

11. The operation method of the projection system according to claim 8, wherein the projection system further comprises a step-down circuit, the operation method further comprising:

stepping down the sequence signal by the step-down circuit, and transmitting the stepped-down sequence signal to the first processing circuit.

12. The operation method of the projection system according to claim 8, wherein the first processing circuit receives the sequence signal via a general-purpose input/output pin or an analog-to-digital pin.

13. The operation method of the projection system according to claim 8, wherein the central control platform transmits the sequence signal to the first processing circuit through a power line communication mechanism, a controller area network, a local interconnect network, or a universal asynchronous receiver/transmitter.

14. The operation method of the projection system according to claim 8, wherein the projection apparatus further comprises a light valve and a light source, and the light valve comprises a microlens array composed of multiple microlenses, the operation method further comprising:

determining, by the light valve, a rotation angle of each of the microlenses according to the image information; and generating multiple color lights by the light source, so that the color lights are sequentially irradiated on the microlens array to thereby generate the display image.

\* \* \* \* \*